United States Patent [19]

Kazaoka et al.

[11] Patent Number: 4,767,157
[45] Date of Patent: Aug. 30, 1988

[54] SEAT LIFTER

[75] Inventors: Kenichi Kazaoka, Nagoya; Hiroshi Okazaki, Toyota, both of Japan

[73] Assignee: Aisin Seiki Kabushiki Kaisha, Kariya, Japan

[21] Appl. No.: 6,340

[22] Filed: Feb. 3, 1987

Related U.S. Application Data

[63] Continuation of Ser. No. 618,871, Jun. 8, 1984, abandoned.

[30] Foreign Application Priority Data

Jun. 16, 1983 [JP] Japan ................... 58-106662
Jun. 17, 1983 [JP] Japan ................... 58-109072
Jun. 24, 1983 [JP] Japan ................... 58-114855
Jun. 27, 1983 [JP] Japan ................... 58-115496

[51] Int. Cl.$^4$ .......................... A47C 1/032; A47C 3/20
[52] U.S. Cl. ....................... 297/322; 248/397; 248/421; 297/329; 297/340; 297/345
[58] Field of Search ............... 297/316, 320–322, 297/325, 329, 340, 383, 345; 248/157, 393, 395–397, 419, 421, 422

[56] References Cited

U.S. PATENT DOCUMENTS 3,337,267 8/1967 Rogers, Jr. ............... 297/340 X
3,869,172 3/1975 James et al. ............... 297/316
4,529,159 7/1985 Terada et al. ............... 297/312 X

FOREIGN PATENT DOCUMENTS 2429497 1/1976 Fed. Rep. of Germany ...... 248/394
718310 2/1980 U.S.S.R. ...................... 248/394

Primary Examiner—Kenneth J. Dorner
Assistant Examiner—Peter R. Brown
Attorney, Agent, or Firm—Finnegan, Henderson, Farabow, Garrett and Dunner

[57] ABSTRACT

The seat lifter according to the invention includes a front and rear links supporting the upper bracket member and the upper bracket member has a first upper bracket supporting a seat cushion of the seat and a second upper bracket supporting a seat back of the seat. Thus, the seat back and seat cushion of the seat are respectively moved in the independent state. Particularly, a pair of second pivoting member respectively pivoting the front and rear links on the first upper bracket positions approximately in a rear direction in respect of a pair of first pivoting member and a pair of third pivoting member respectively pivoting the front and rear links on said second upper bracket positions approximately in an upper direction in respect of said first pivoting. In accordance with lifting the seat cushion by rotating the both links around the first pivoting member, the seat back moves in a forward direction and the size of the seat cushion is minimized.

6 Claims, 17 Drawing Sheets

SEAT LIFTER

This application is a continuation of application Ser. No. 618,871, filed June 8, 1984, now abandoned.

BACKGROUND OF THE INVENTION

1. Field of the Invention

The present invention relates to a seat lifter and, more particularly, to a seat lifter for vehicle seats.

2. Description of the Prior Art

A conventional seat lifter, as shown in FIG. 1, includes two pairs of links 2,3 and each pair of links 2,3 is respectively disposed at a front and a rear portion of a side of a seat (not shown). An end of each of the links 2,3 is pivoted on a lower bracket 1 which is to be mounted on a vehicle body (not shown) with a pivot pin 10,11 and the other end of each of the links 2,3 is pivoted on an upper bracket 4 supporting a seat cushion (not shown) of the seat.

One of the links 2, which is positioned along the side of the front of the seat, is operatively connected to a clutch means such as a spring coupler apparatus 6 through a plate 8. One end of the plate 8 is pivoted on the link 2 and the other end of the plate 8 is pivoted on a driven member of the clutch means 6. The clutch means 6 has a lever 7; and by manually operating the lever 7, the driven member 6 is rotated. However, the rotation of the driven member 6 will not be transmitted to the lever 7. Thus, in accordance with the manual rotation of the lever 7, the position of the driven member 6 is changed and the driven member 6 is arrested at the changed position.

Therefore, as shown in FIG. 1, the link 2 is rotated around the pin 10 through the plate 8 in a direction shown by an arrow (C), since the end of the plate 8 is rotated in a direction shown by an arrow (B) in response to rotation of the lever 7 in a direction shown by an arrow (A). As each link 2,3 is connected to each other through the upper bracket 4, the upper bracket 4 for the seat cushion is lifted upwards as an entire unit. Thus, the height of the seat cushion is adjusted.

Accordingly, with such a vehicle seat, the position of the seat cushion may be raised on occasions where an occupant in the seat is short and the position of the seat cushion may be lowered on occasions where the occupant in the seat is tall. As a result, every occupant may select an optimal position for driving the vehicle comfortably.

However, in the above conventional seat lifter, the links 2,3 are arranged approximately parallel to each other; and the size of the links 2,3 is substantially equal to each other. Thus, as shown in FIG. 1a, the upper bracket 4 for the seat cushion is lifted as a unit. By raising the height of the seat cushion, a front end of the seat cushion which supports the knee portion of the occupant is also raised; so that if the occupant is short and the legs of the occupant are also short, the feet of the occupant may not reach adequately the vehicle floor. Thus, it will be hard to operate a braking pedal, an acceleration pedal, or a clutch pedal provided on the vehicle floor.

Further, a bracket 9 for a seat back (not shown) is provided on the upper bracket 4. Thus, the relative position between the seat cushion and the seat back, or the length of the seat cushion, is not changed by adjusting the height of the seat cushion, even though the femoral length of the seat is varied.

Besides, since the seat cushion is mounted on the upper bracket 4, the upper bracket 4 must have enough thickness; and the structure thereof must be sufficient to withstand a heavy load on the seat cushion. Further, the clutch means is connected to the link 2 which is positioned at the front side so as to easily operate the lever. Therefore, the front links 2 are readily arrested. However, the rear links 3, substantially supporting the waist of the occupant, are arrested through the upper bracket 4. As the rear portion of the upper bracket 4 will easily rattle, the rear links 3 need adequate mechanical strength.

Still further, in the event that the spring coupler apparatus is used as the clutch means, a play of the driven member 6 thereof cannot be avoided. Accordingly, since the link 2 connected to the driven member oscillates, it can be uncomfortable to sit on the seat cushion.

SUMMARY OF THE INVENTION

It is, therefore, a primary object of the invention to provide an improved seat lifter by solving the drawbacks in the conventional seat lifter described above.

Another object of the invention is to provide an improved seat lifter having a simple structure.

According to the invention, a seat lifter includes front and rear links supporting upper bracket means, and the upper bracket means has a first upper bracket supporting a seat cushion of the seat, and a second upper bracket supporting a back of the seat. Thus, the seat back and seat cushion of the seat are respectively moved independently. Particularly, the first upper bracket is pivotably connected by a pair of second pivoting means to each of the front and rear links respectively. Each pair of second pivoting means is positioned rearwardly of a respective pair of first pivoting means; and the second upper bracket is pivotally connected by a pair of third pivoting means to each of the front and rear links respectively. Each pair of third pivoting means is positioned upwardly of a respective pair of said first pivoting means. Upon lifting the seat cushion by rotating both of the links around the first pivoting means, the seat back moves in a forward direction, minimizing the size of the seat cushion.

Also, the distance between the first and second pivoting means in the front link is slightly greater than such distance in the rear link; but an angle formed by the second pivoting means when rotated about the first pivoting means from the horizontal is larger in the rear link than such angle of the front link. When the height of the seat cushion supporting the occupant is changed, the vertical change of the second pivoting means of the rear link is smaller than for the second pivoting means of the front link.

Further, the first upper bracket, which supports a seat cushion of the seat, is formed as a front and rear connecting means, respectively disposed between a pair of front and rear links. Thus, the seat cushion is supported by a simple structure. Still further, the clutch means provided on the front side of the seat is operatively connected to the rear link. Thus, the rear link is surely arrested by the clutch means; and has sufficient mechanical strength.

Besides, a spring coupler apparatus is used as the clutch means, and is operatively connected to one of said front and rear links; and the spring coupler apparatus includes a base member provided on the one of the links around the first pivoting means, a drive member integrally mounted on the first pivoting means of the one of the links, a driven member rotatably provided on the first pivoting means of the other of the links so as to be rotatable with the rotation of the first pivoting means through the drive member, a coil spring frictionally connected to the base member so as to arrest the rotation of the driven member, and the spring member operatively connected to the drive member so that when the first pivoting means of the one of the links is rotated, the coil spring is released from the base member and permits the rotation of the driven member with the drive member, and a connecting plate disposed between the driven member of the clutch means and the one of the links so that when the first pivoting means rotates in one direction thereon, the one link rotates in the other direction around the first pivoting means.

Therefore, when the one link has a slight play around the first pivoting means, and is rotatable around the first pivoting means, the one link or the base member and the driven member, respectively, rotate in one direction and in the other direction around the first pivoting means. The play of the one link is divided into two parts so that the rattle of the one link or the seat is reduced extremely. Further, the relative rotation between the base member and the driven member is the same as the prior art. Thus, the frictional connection between the base member and the coil spring according to the rattle of the one link is similar to the prior art.

The accompanying drawings, which are incorporated in and constitute part of this specification, illustrate embodiments of the invention and, together with the description, serve to explain the principles of the invention.

DETAILED DESCRIPTION OF THE PREFERRED EMBODIMENT

Figure 1:
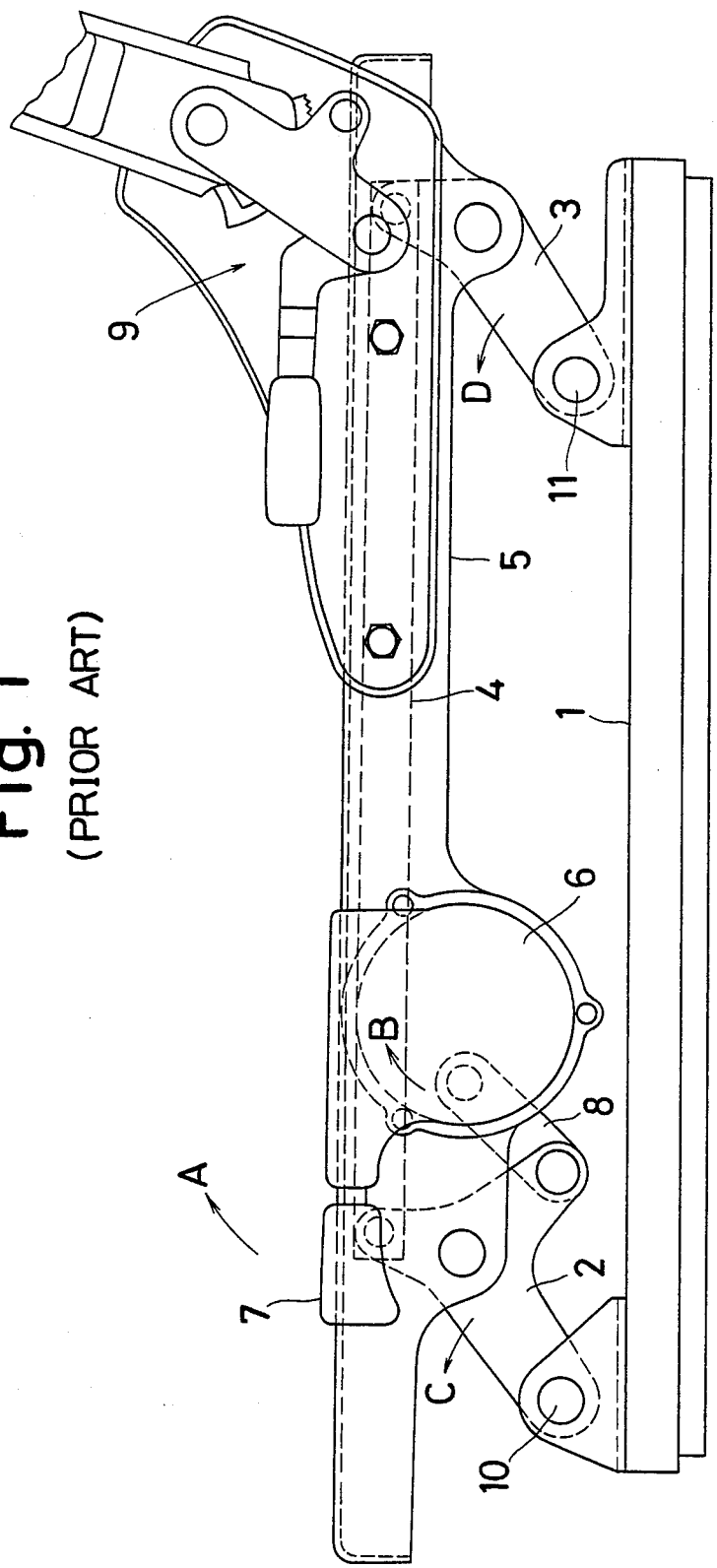
FIG. 1 is a side view of a conventional seat lifter for vehicles.
Figure 1A:
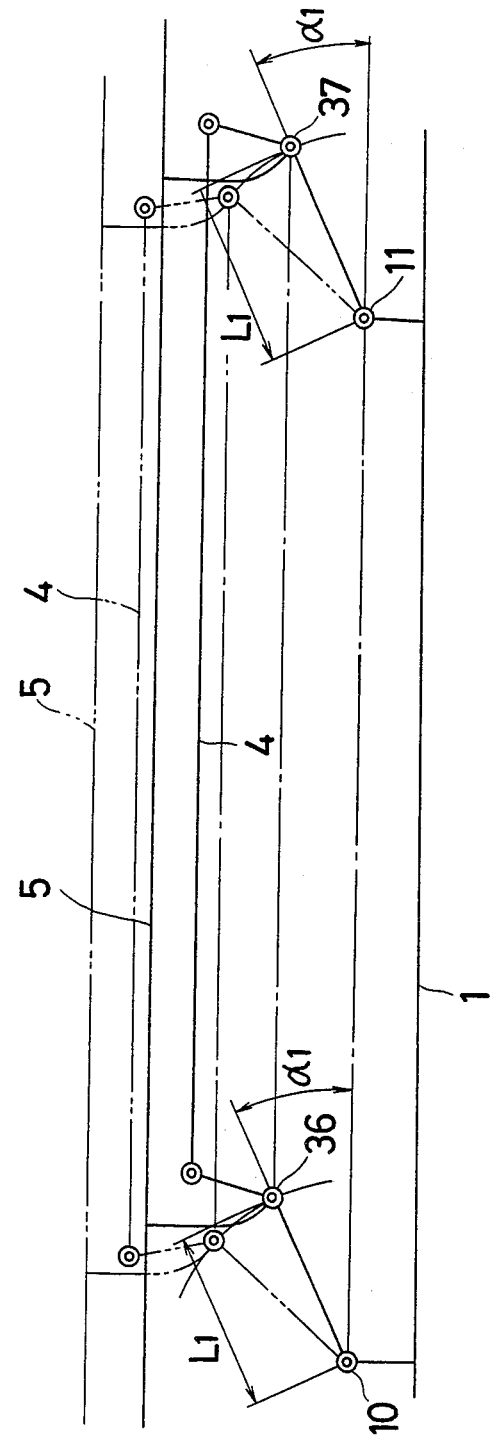
FIG. 1a is a side view of a fundamental structure of the seat lifter shown in FIG. 1.
Figure 2:
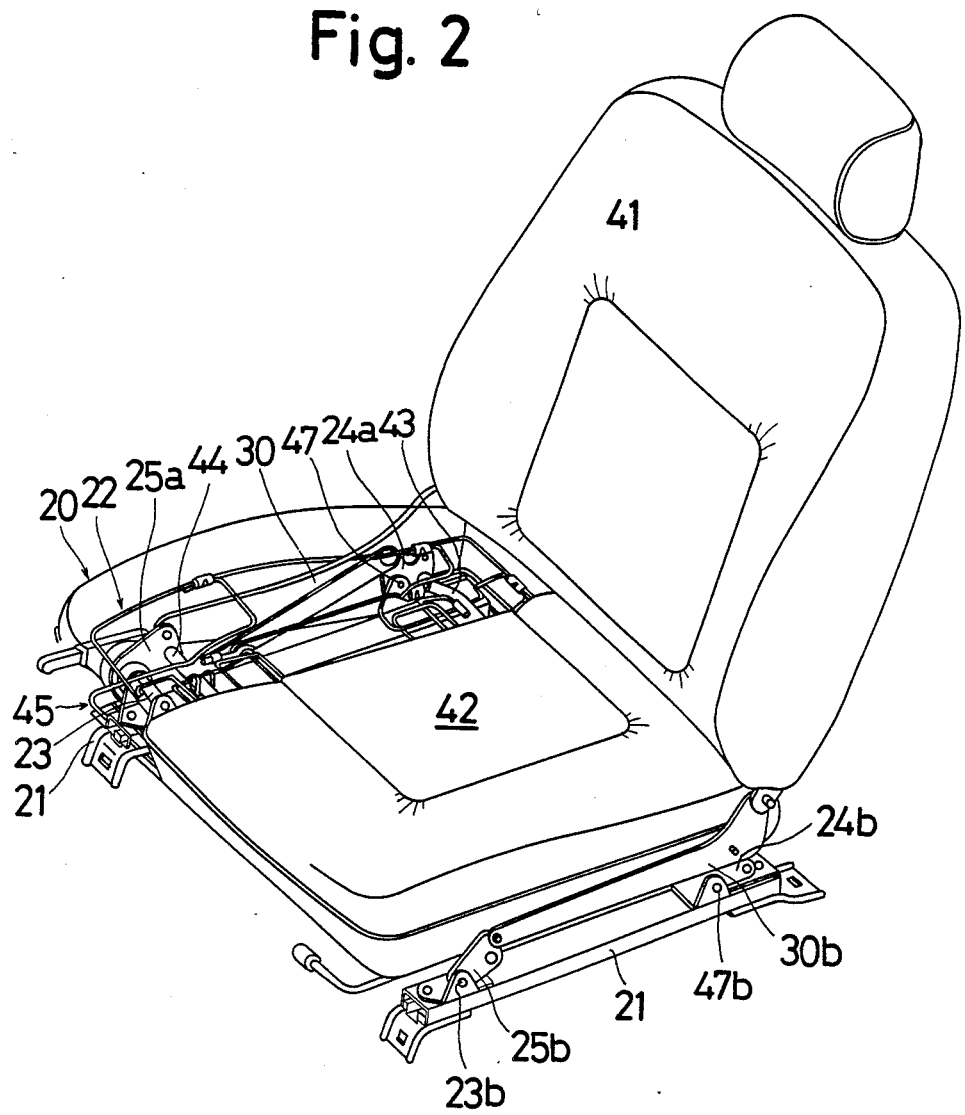
FIG. 2 is a perspective view of a seat with a seat lifter according to the invention.
Figure 3:
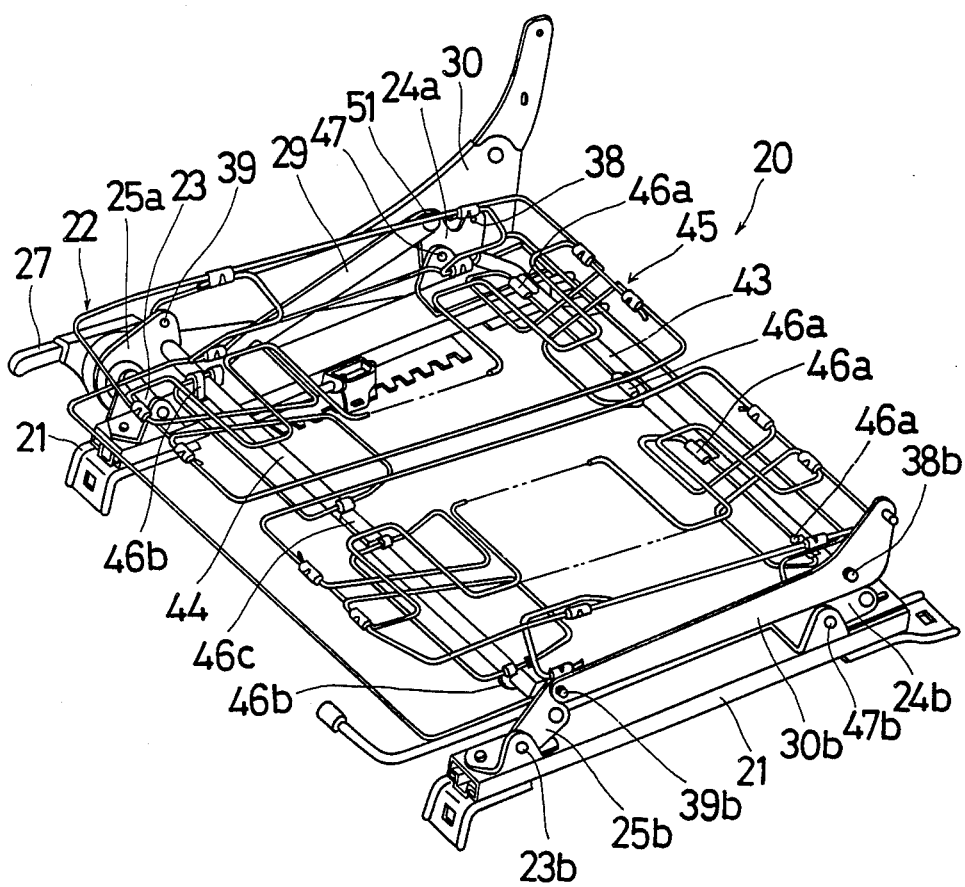
FIG. 3 is a perspective view of the seat lifter shown in FIG. 2.

Now referring to FIGS. 2 to 7, one embodiment according to the invention is shown. As shown in FIG. 2, a seat for vehicles includes a seat back 41 and a seat cushion 42. The seat back 41 and the seat cushion 42 is supported by a seat lifter 20 in a vertical movable state. As shown in FIG. 3, the seat lifter 20 has a pair of lower brackets 21 mountable on a vehicle floor. The brackets 21 are respectively provided along both sides of the seat cushion 42. A pair of front links 25a, 25b and a pair of rear links 24a, 24b of the link means are provided on the lower bracket 21; and the front links 25a, 25b and the rear links 24a, 24b are respectively rotatably mounted on the front and rear ends of the lower bracket 21 through coaxial pivot pins 23, 23b and 47, 47b of first pivoting means.

Seat supporting means, such as a pair of elongated pipes 44, 43, is respectively disposed between each of the front links 25a, 25b and each of the links 24a, 24b. The pipes 44, 43 cause namely each pair of links 25a, 25b, and rear links 24a, 24b to operate as a unit. Particularly, both ends of the rear pipe 43 are bent; and the main portion of the pipe 43 is positioned along the rear side of the seat. Since each of the rear links 24a, 24b and each of the front links 25a, 25b are interlocked through a respective pipe 44, 43, each pair of rear links 24a, 24b and front links 25a, 25b of the seat lifter has sufficient mechanical strength.

Additional seat supporting means, such as a seat cushion spring 45, is disposed below the seat cushion 42 and elastically supports the seat cushion 42 thereon. The front end of the seat cushion spring 45 is secured with clips 46b, 46b and 46c fixed on the front pipe 44; and is movable back and forth relative to the pipe 44. However, the rear end of the spring 45 is secured with clips 46a, 46a and 46a rotatably fixed on the rear pipe 43, and thus slightly rotatable on the pipe 43. Namely, since the pipes 44, 43 serves as seat cushion brackets supporting the seat cushion 42; and second pivoting means pivotably supports the seat cushion 42 on the front and rear links, the structure of the seat lifter becomes simple.

A pair of seat back brackets 30,30b extend along both lower brackets 21,21. The front ends of each bracket 30,30b are rotatably connected to each respective front link 25a, 25b through pins 39, 39b; and the rear ends thereof are rotatably connected to each respective rear link 24a,24b through pivot pins 38,38b of a third pivoting means.

Figure 4:
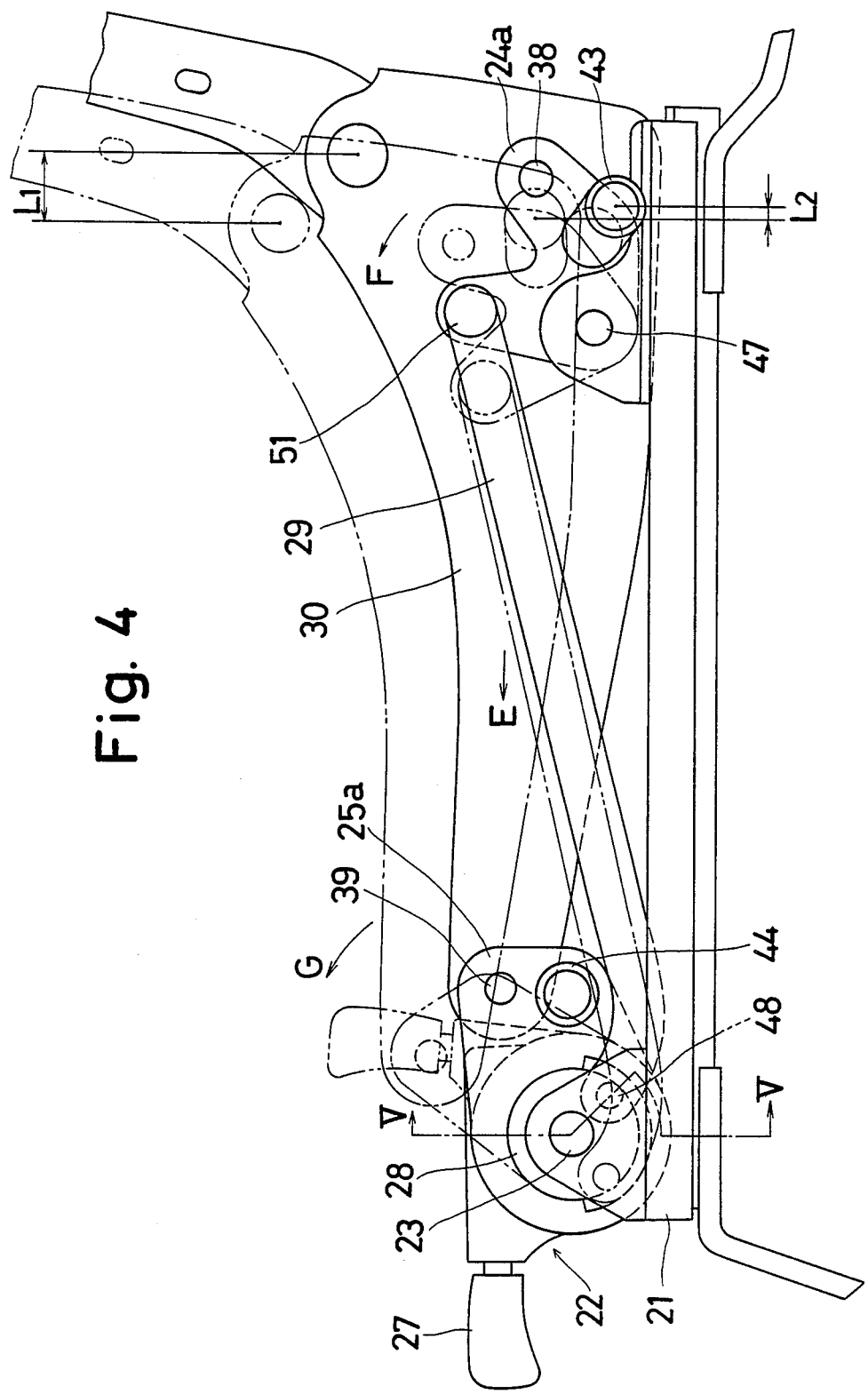
FIG. 4 is a side view of the seat lifter shown in FIG. 2.

A spring coupler apparatus 22, as a clutch means, is provided on the front link 25a around the pin 23 so as to be easily operated by the occupant. The spring coupler apparatus 22 is operatively connected to a plate 29. Opposite ends of the plate 29 are pivoted on a driven member 28 of the spring coupler apparatus 22, and the rear link 24a respectively as shown in FIG. 4. Therefore, upon the rotation of the driven member 28, the rear link 24a is rotated around the pin 47. Simultaneously, since the rear link 24b is rotated by the pipe 43; and both front links 25a,25b are rotated through the respective brackets 30,30b, the positions of the pipes 44,43 supporting the seat cushion 42, and the brackets 30,30b supporting the seat back 41, are changed. Further, the rotation of the rear link 24a supporting the rear end of the seat cushion 42; or the waist portion of the occupant is arrested by the spring coupler apparatus 22. Thus, the play of the rear link 24a is decreased and the durability increases.

The rear link 24a is formed as an L shape; and has an arm portion for the connecting plate 29, as shown in FIG. 4. The arm portion is provided above the link portion and a pin 51 on which the plate 29 pivots is mounted thereon. Further, FIG. 4 shows one side of the seat lifter positioned above and at the lower most position. In the lower most position, one end of the pipe 43 which rotatably supports the rear end of the seat cushion 42 and fixed on the rear link 24a is approximately positioned rearwardly of the pin 47 but slightly below the pin 47 from the horizontal. Pin 38 which rotatably supports the rear end of the seat back bracket 30 on the rear link 24a, is positioned rearwardly of the pin 47 and above the pin 47 from the horizontal. Also, the pin 51, on which the one end of the plate 29 points on the one rear link 24a, is slightly positioned rearwardly of and above the pin 47.

Also, the front link 25a, to which one end of the pipe 44 is fixed, and slidably supports the front side of the seat cushion 42, is positioned rearwardly of the pin 23. The pin 39, which rotatably supports the front end of the seat back bracket 30 on the front link 25a, is positioned at the rear of the pin 23 and above the pin 23 from the horizontal. Further, the distance between the pin 23 and the pipe 44 in the front link 25a is larger than that between the pin 47 and the pipe 43 in the rear link 24a, where the pipe 43 is bent and the main portion thereof which rotatably supports the rear end of the seat cushion 42, is positioned at the rear side of the seat cushion 42 as shown in FIG. 2.

The other side of the seat lifter (not shown in FIG. 4), the other end of each pipe 44, 43 and each pin 39b, 38b, are provided on the front and rear link 25b, 24b, the same as the one side shown in FIG. 4.

Figure 5:
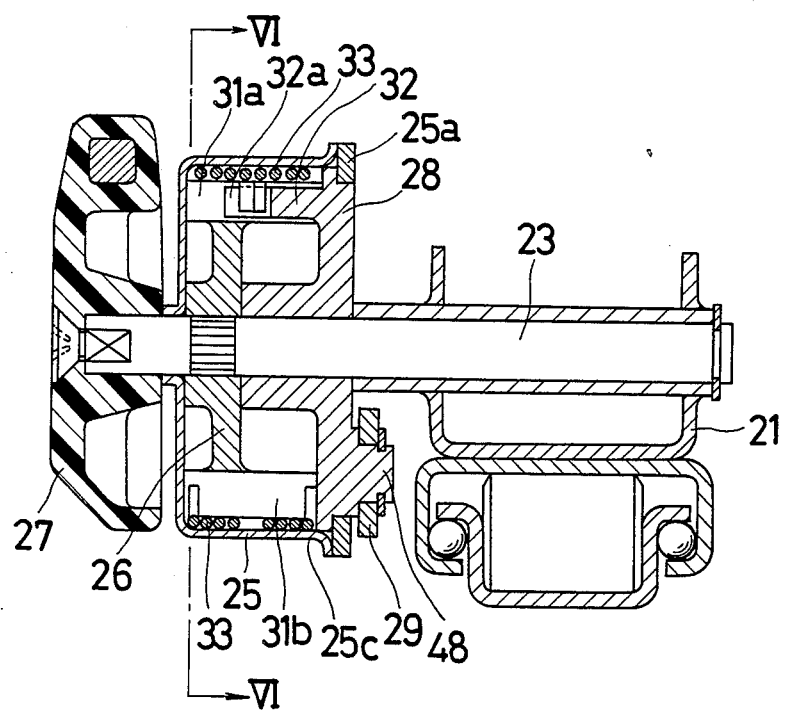
FIG. 5 is a sectional view taken along line V—V in FIG. 4.

As shown in FIG. 5, the pin 23, around which the spring coupler apparatus 22 is provided, is shaped as a handle shaft; and one end of the pin 23 is rotatably supported on the lower bracket 21, and the other end of the pin 23 is rotatably supported on the casing 25c of the base member mounted on the front link 25a. Namely, the front link 25a is rotatably supported on the pin 23. Further, a handle lever 27 is fixedly mounted on the top end of pin 23.

Figure 6:
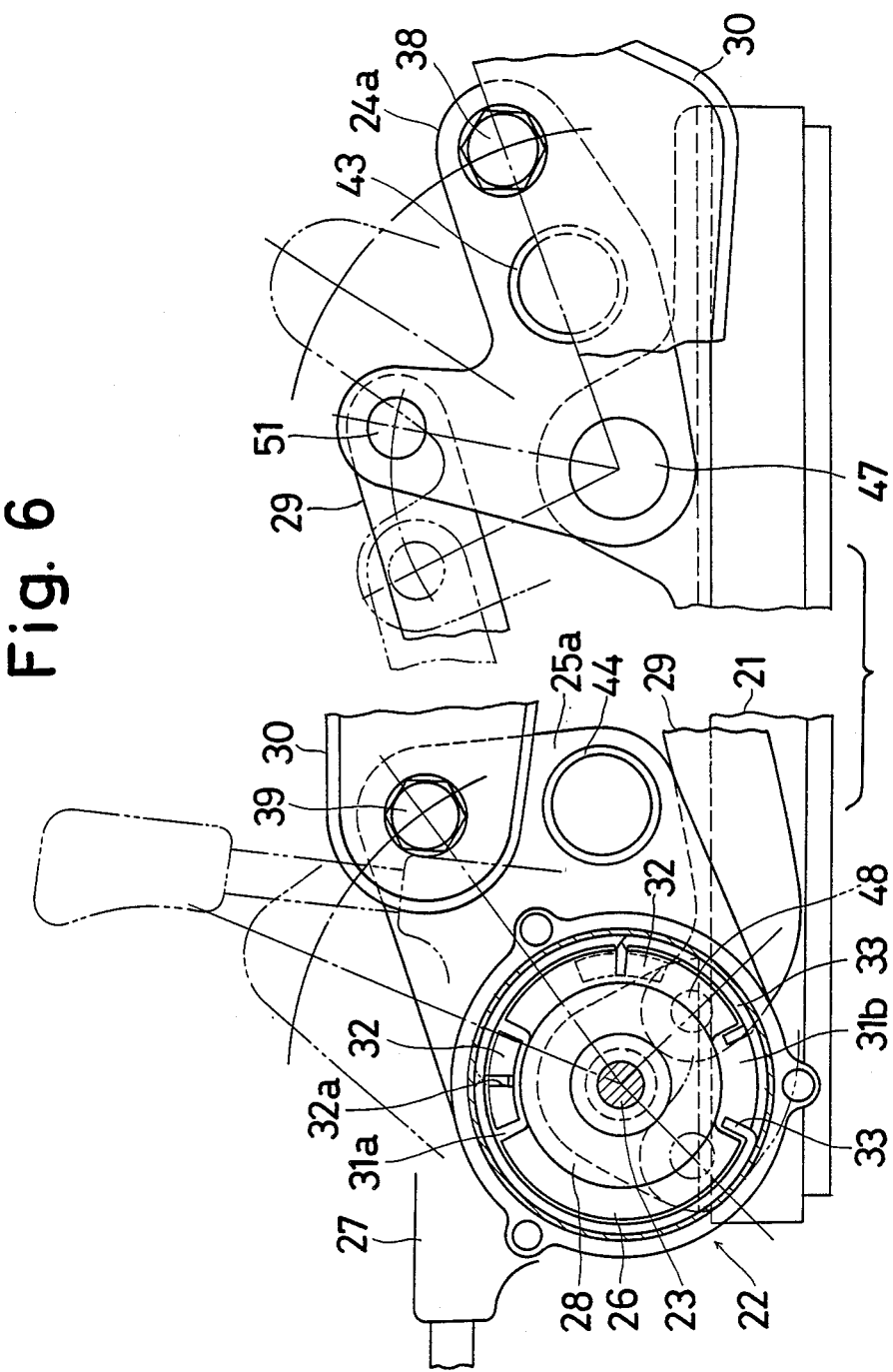
FIG. 6 is a partial expanded side view of the seat lifter shown in FIG. 2.

The casing 25c has a hollow portion, and a drive member 26 and the driven member 28 are housed therein. The drive member 26 is fixed on the pin 23, but the driven member 28 is rotatably mounted on the pin 23. A pair of coil spring 33,33 are disposed in series between the drive member 26 and the casing 25c and the outer surface of both springs 33,33 are frictionally connected with the inner surface of the hollow portion of the casing 25c in normal condition. As shown in FIG. 6, the drive member 26 has two recessed portions 31a, 31b and the one recessed portion 31a is engaged with a projected portion 32 formed on the driven member 28 with a clearance therebetween. Thus, the driven member 28 can be also rotated with the pin 23 through the drive member 26.

The projected portion 32 has a slit 32a, and one end of the one spring 33 is engaged therewith. The other end of the spring 33 is engaged with one shoulder portion of the recessed portion 31b so that when the drive member 26 is rotated in clockwise direction as viewed in FIG. 6, the one spring 33 may be compressed by the engagement between the one end of the one spring 33 and the one shoulder portion of the recessed portion 31b and released from the inner surface of the casing 25c. And in the other spring 33, the one end thereof is engaged with the other shoulder portion of the recessed portion 31b, and the other end thereof is engaged with slit 32a so that when the drive member 26 is rotated in counter-clockwise direction as viewed in FIG. 6, the other spring 33 may be compressed by the engagement between the one end of the other spring 33 and the one shoulder portion of the recessed portion 31b, and released from the inner surface of the casing 25c. The driven member 28 has a bearing portion 48 and the one end of the plate 29 is rotatably engaged therewith. In the lowermost position shown in FIG. 4, the bearing portion 48 is positioned at the rear of and below the pin 23. The bearing portion 48 moves substantially back and forth with the rotation of the handle 27 of the pin 23.

Therefore, when the driven member 28 rotates in the clockwise or counter-clockwise direction, one of the springs 33,33 is compressed while the other is expanded, arresting rotation of the driven member 28 by the frictional connection with the inner surface of the casing 25c in the expanded spring. However, when the drive member 26 rotates, one of the springs 33,33 is engaged with the shoulder portion of the recessed portion 31b of the drive member so that the one spring 33 is compressed and released from the inner surface of the casing 25c at first. By further rotation of the drive member 26, the recessed portion 31a of the drive member 26 abuts against the projected portion 32; thus since the driven member 28 is rotated, the other spring 33 is also compressed and released from the inner surface of the casing 25c. Since both springs 33,33 are released from the inner surface of the casing 25c, the driven member 28 becomes rotatable, and rotates in accordance with the rotation of the drive member 26.

According to this embodiment, the seat lifter 20 is raised and lowered by the rotation of the handle 27. When the handle 27 is rotated in the clockwise direction as shown in FIG. 6, the pin or handle shaft 23 and the drive member 26 also rotates in the same direction. As the shoulder portion of the drive member 26 engages the one end of the spring 33, the spring 33 is compressed and released from the inner surface of the casing 25c. By further rotation of the drive member 26, the recessed portion 31a thereof abuts against the projected portion 32 of the driven member 28 and the driven member 28 also rotates in the clockwise direction around the pin 23. Since the one end of the other spring 33 is engaged with the slit 32a of the driven member 28, the other spring 33 is also compressed and released from the inner surface of the casing 25c. Accordingly, the driven member 28 is rotated in the clockwise direction, and the plate 29, which is rotatably mounted on the driven member 28, is moved forwardly in the direction of an arrow (E) in FIG. 4, which is opposite the direction of rotation of the driven member 28. By the forward movement of the plate 29, the rear link 24a is rotated in the counter-clockwise direction about pin 47 in the direction of an arrow (F) in FIG. 4. Thus, the rear links 24a, 24b are lifted around the pins 47 and 47b through the rear pipe 43. Further, the front link 25a and 25b are respectively lifted around the pin 23 through the bracket 30 and 30a as in the direction of an arrow (G) in FIG. 4. Thus, the pipes 44 and 43 and the seat cushion 42 supported thereby, is lifted as drawn in a chain dotted line of FIG. 4. Upon release of the handle lever 27, the coil springs 33, 33 are expanded and the outer surface of the coil spring 33,33 frictionally connects to the inner surface of the casing 25c again so that even though the driven member 28 will rotate around the pins 23,23b,47,47b by the weight of the occupant, one of the coil springs 33,33 is always expanded, and the frictional connection state is maintained. Since the rotation of the driven member 28 is surely arrested, the height of the seat cushion 42 is steplessly changed and the seat cushion 42 is supported at the changed position as drawn in the chain dotted line.

Figure 7:
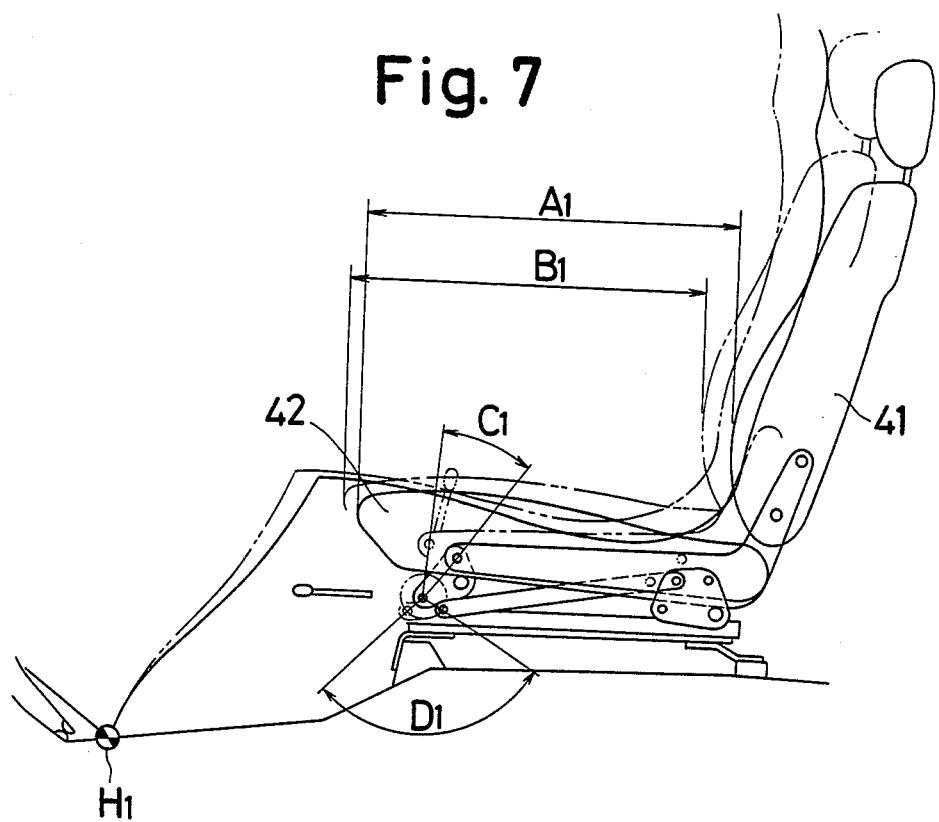
FIG. 7 is a side view of a seat with the seat lifter shown in FIG. 2 illustrating operating positions of the seat.

Particularly, since both ends of the pipe 43 are respectively positioned rearwardly of the pins 47,47b on the rear links 24a,24b, the pipe 43 moves vertically in accordance with the rotation of the rear links 24a, 24b around the pins 47,47b; and the pipe 43 moves back and forth between the lower most position and the upper most position by a slight distance L2, as shown in FIG. 4. However, since the pins 38,38b respectively, which pivot the rear ends of the bracket 30,30b on the rear link 24a,24b, are positioned at the upper position of the pipe 43, the bracket 30,30b of the seat back 41 is lifted up and down, and moves back and forth, in accordance with the rotation of the rear links 24a,24b, so that the seat back 41 moves back and forth between the lower most position and the upper most position by a distance L1, which is larger than the distance L2. Therefore, since the seat back 41 relatively moves against the seat cushion 42 by the difference between the distance L1 and L2 in accordance with the lifting up the seat cushion 42, the size of the seat cushion 42 is minimized from the maximum length A1 to the minimum length B1 as shown in FIG. 7.

Further, the lifting distance between the pin 23 and the pipe 44 in the front link 25a is smaller than that between the pin 47 and the pipe 43 in the rear link 24a. Thus, the lifting distance of the pipe 44 or the front end of the seat cushion 42 is smaller than that of the pipe 43 or the rear end thereof in accordance with the lifting of the seat cushion 42. The height of the front end of the seat cushion 42 is kept approximately constant so that the waist position of the occupant is changed so as to easily operate the steering handle, (not shown) but the knee portion is not changed so as to easily operate the pedals as shown in FIG. 7. In FIG. 7, the range (C1) and (D1) respectively show the rotation range of the front link 25a and the driven member 28 between the lowermost position drawn in a solid line and the uppermost in a chain dotted line. The point (H1) shows the heel portion of the occupant.

In the spring coupler apparatus 22, the casing 25c is provided on the link, particularly the front link 25a; and the handle shaft is integrally formed on the pivot pin 23 for the front link 25a. Thus, when the rear link 24a is rotated around the pin 47 in the clockwise direction in FIG. 4 by the load from the seat, the casing 25c is rotated in the clockwise direction around the pin 23 through the bracket 30 and the front link 25a. However, the driven member 28 is rotated in the counter-clockwise direction around the pin 23 through the connecting plate 29 as the connecting plate 29 is disposed between the lower portion of the driven member 28 and the upper portion of the rear link 25a. Since the casing 25c is also rotated around the pin 23, the frictional force between the coil spring 30 and the casing 25c increases. Therefore, the play of the driven member 28 or the link 24a is reduced and the seat is supported without rattle.

Figure 9:
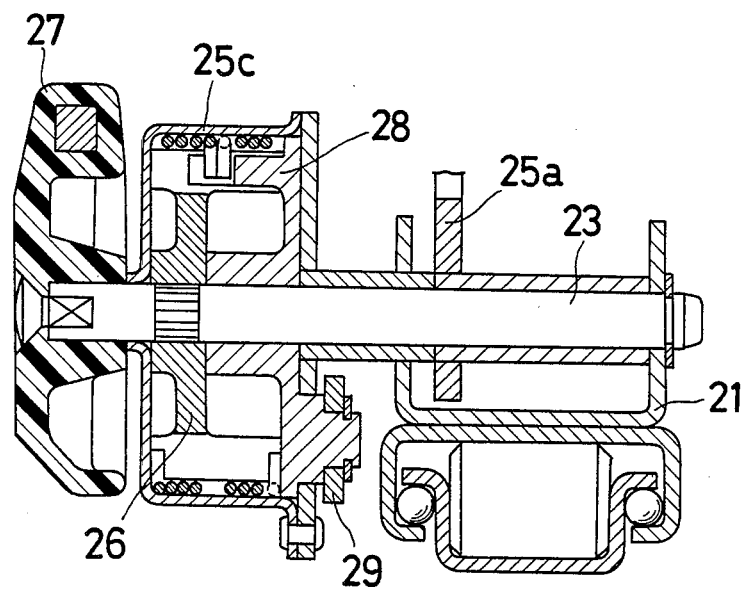
FIG. 9 is a sectional view taken along line IX—IX in FIG. 8.
Figure 8:
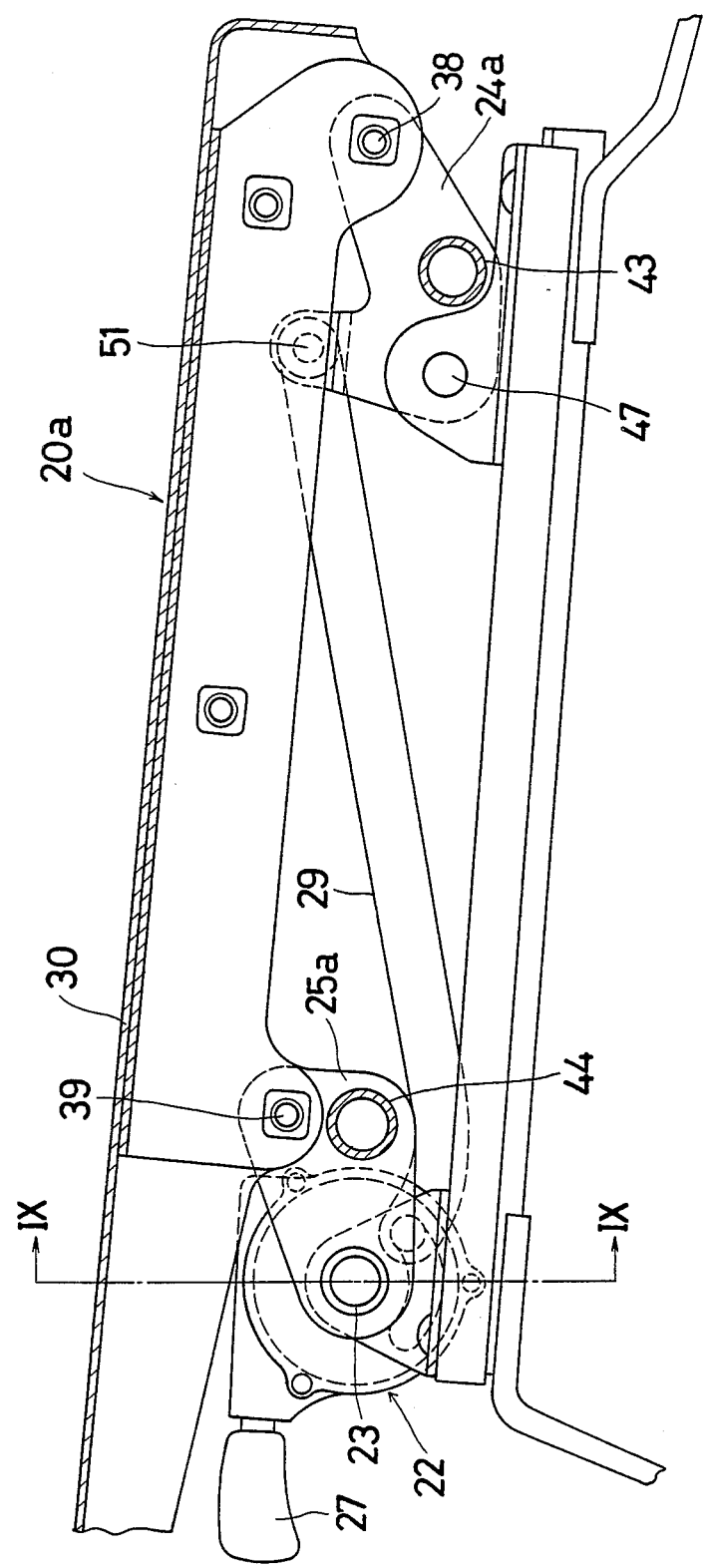
FIG. 8 is a side view of seat lifter according to a second embodiment of the invention.

Another embodiment according to the invention is shown in FIGS. 8 and 9. This seat lifter 20a has a similar structure to the lifter 20 without the spring coupler apparatus 22. Namely, as shown in FIGS. 8 and 9, the casing 25c is spaced from the front link 25a. Thus, the casing 25c does not move with the rotational movement of the front link 25a.

Figure 10:
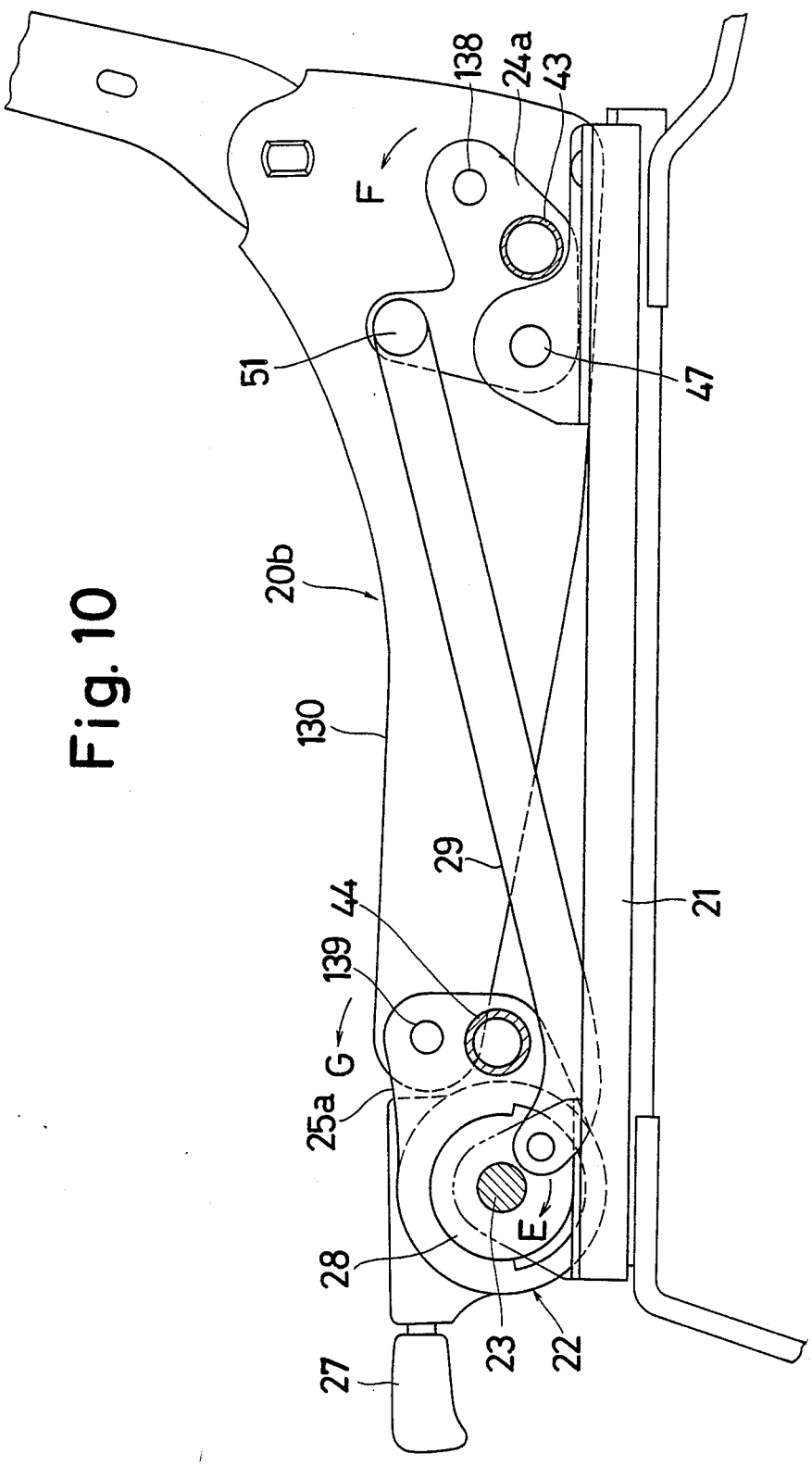
FIG. 10 is a side view of a seat lifter according to a third embodiment of the invention.
Figure 11:
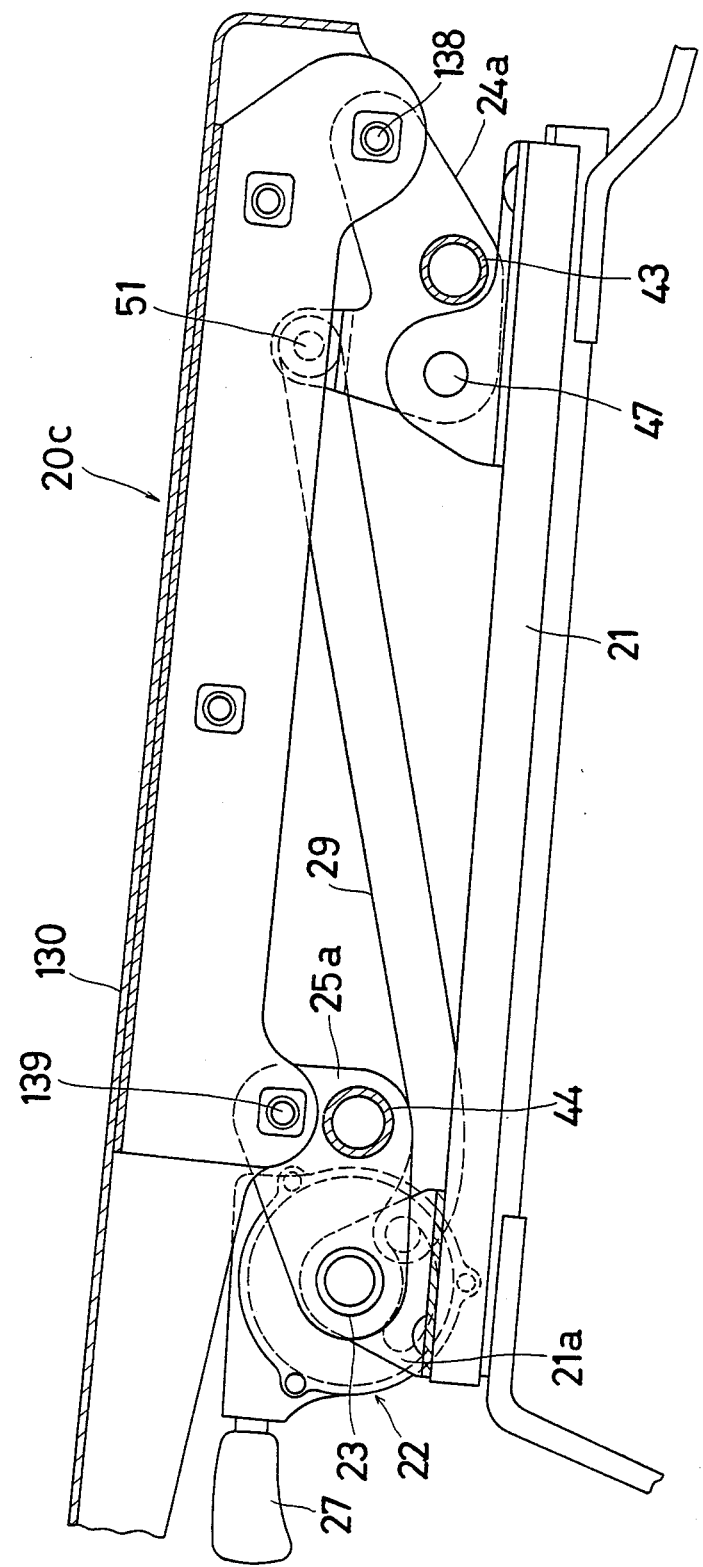
FIG. 11 is a side view of a seat lifter according to a fourth embodiment of the invention.
Figure 12:
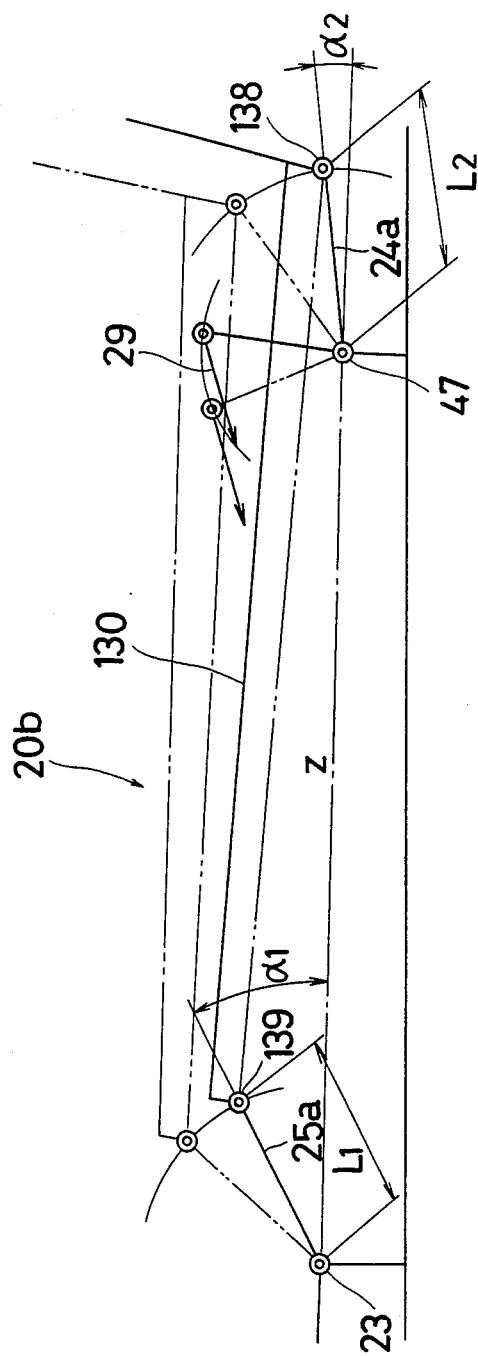
FIG. 12 is a side view of a fundamental structure of the seat lifter of FIG. 10.

Third and fourth embodiments are shown in FIGS. 10 to 13. As shown in FIG. 10, a seat lifter 20b according to the third embodiment has a similar structure to the lifter 20, except that bracket 130 of the third embodiment also supports the seat (not shown). The bracket 130 supports both of the seat cushion 42 and the seat back 41. The pivot pin 139 and 138, respectively, which pivot the front and rear ends of the bracket 130 on the front and rear link 25a and 24a, are positioned as shown in FIG. 12. In the lower most position, the distance (L1) between the pins 23 and 139 in the front link 25a is substantially equal to the distance (L2) between the pins 47 and 138. The angular orientation of the pivot pins 138, 139 relative to a plane "z" extending through pins 23 and 47 is such that $\alpha 1$ is larger than $\alpha 2$; however, when the seat is raised, as shown in FIG. 12, the pivot pin 138 of the rear link 24a pivots slightly more than the front pivot pin 139. Thus, the height of the rear end of the seat cushion 42 is changed on a larger scale than the height of the front end, as illustrated in FIG. 12.

Figure 13:
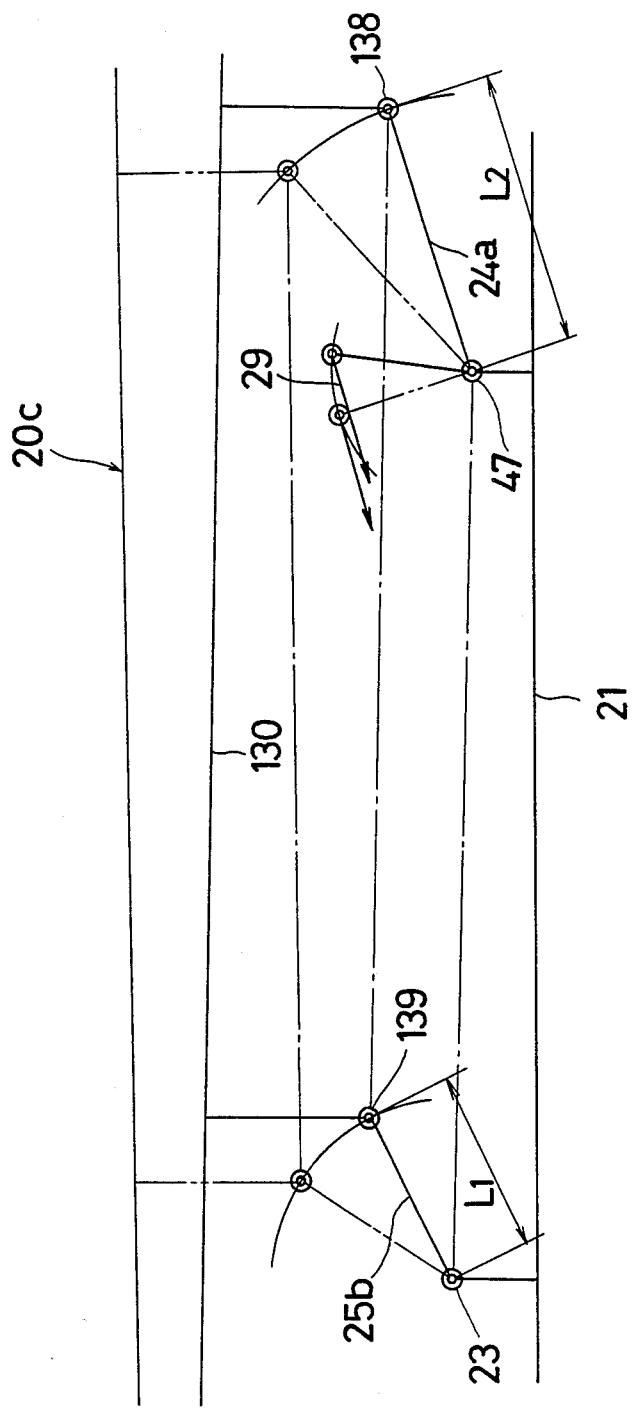
FIG. 13 is a side view of a fundamental structure of the seat lifter of FIG. 11.
Figure 14:
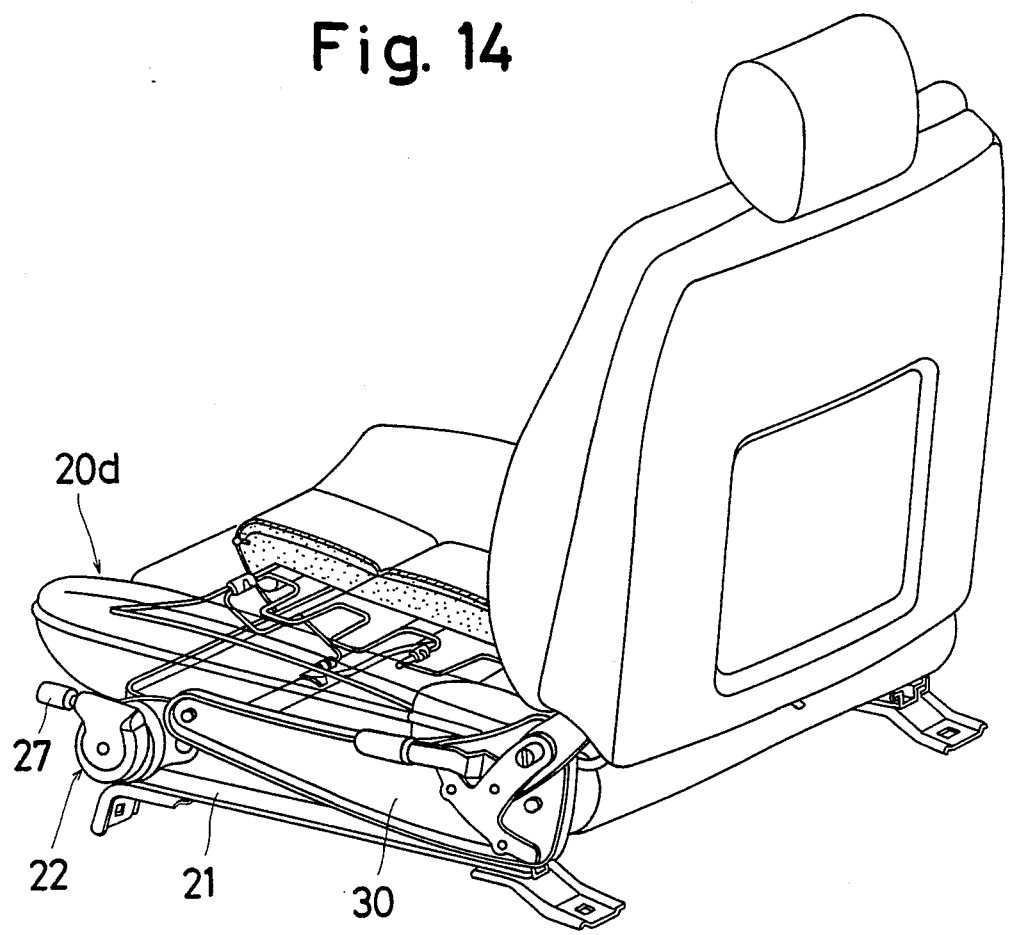
FIG. 14 is a perspective view of a seat with a seat lifter according to a fifth embodiment.

Also, the bracket 130 supports the seat lifter 20c shown in FIG. 11, according to the fourth embodiment. Also, as shown in FIG. 13, the distance (L1) between the pins 23 and 139 in the front link 25a is less than the distance (L2) between the pins 47 and 138 so that when rotated by the same angle, the height of the rear end of the seat cushion 42 is changed on a larger scale than the height of the front end thereof.

Figure 15:
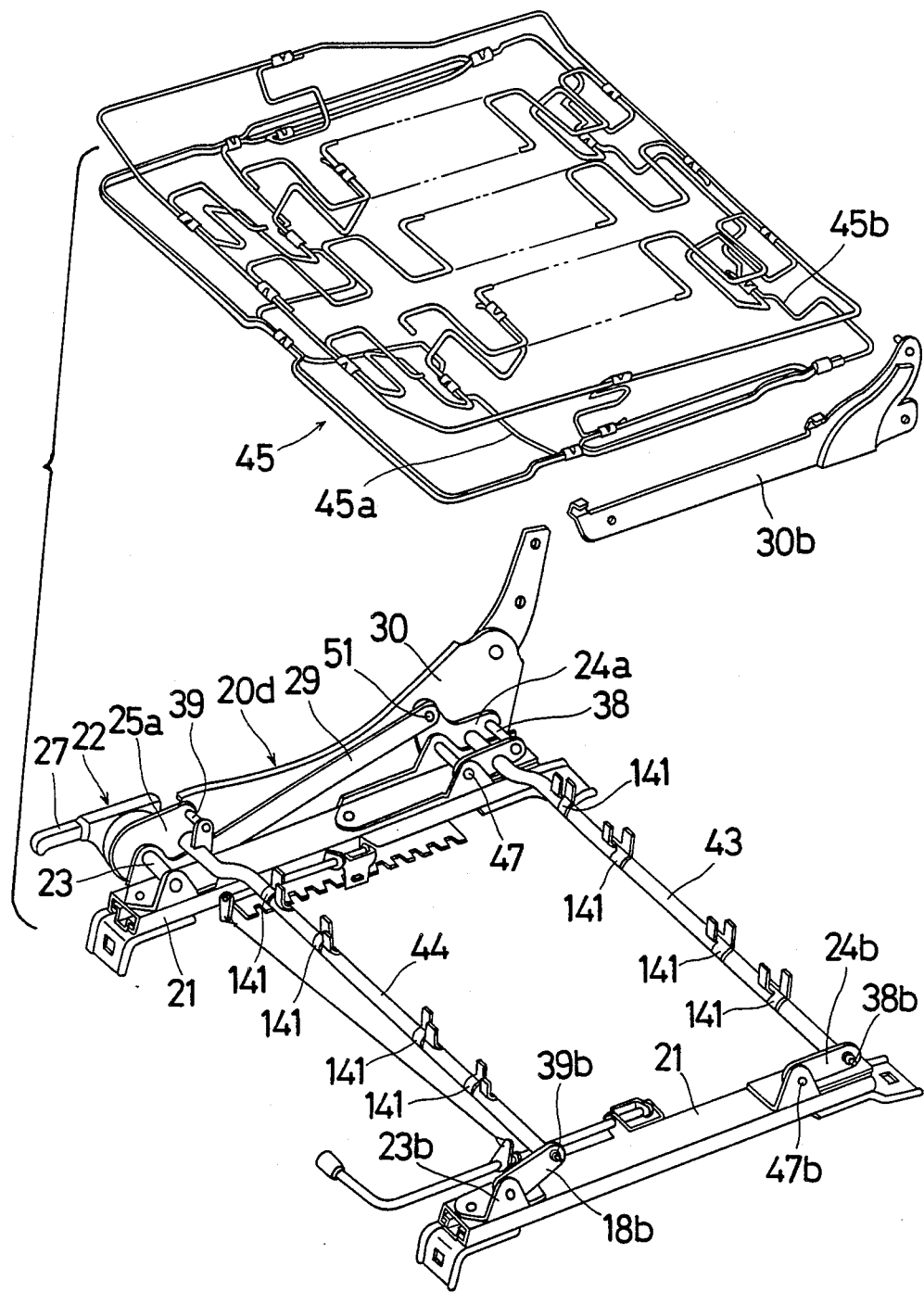
FIG. 15 is an exploded perspective view of the seat lifter of FIG. 14.
Figure 16:
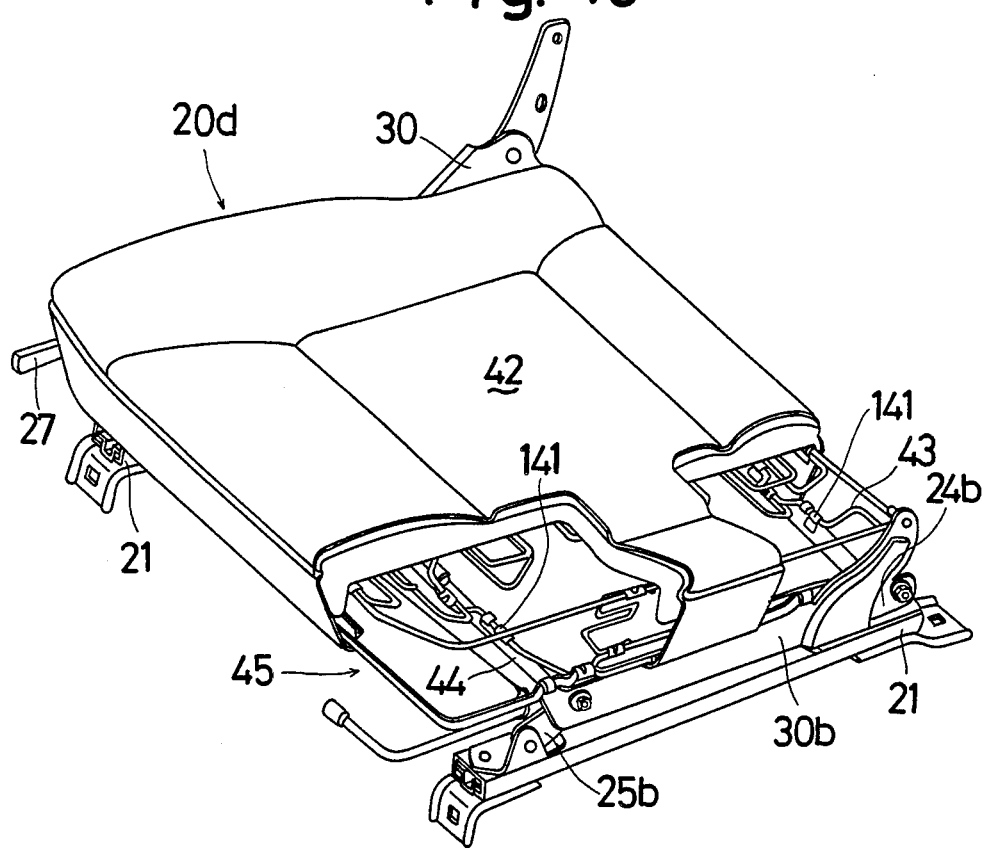
FIG. 16 is a perspective view of a seat cushion with the seat lifter of FIG. 14.
Figure 18:
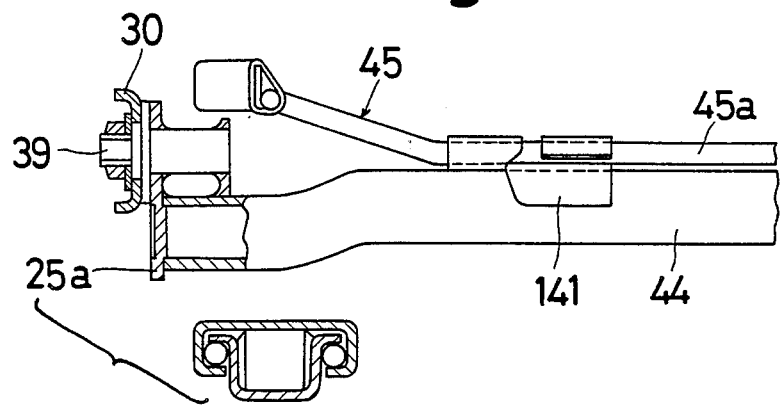
FIG. 18 is a sectional view taken along line XVIII—XVIII in FIG. 17.
Figure 17:
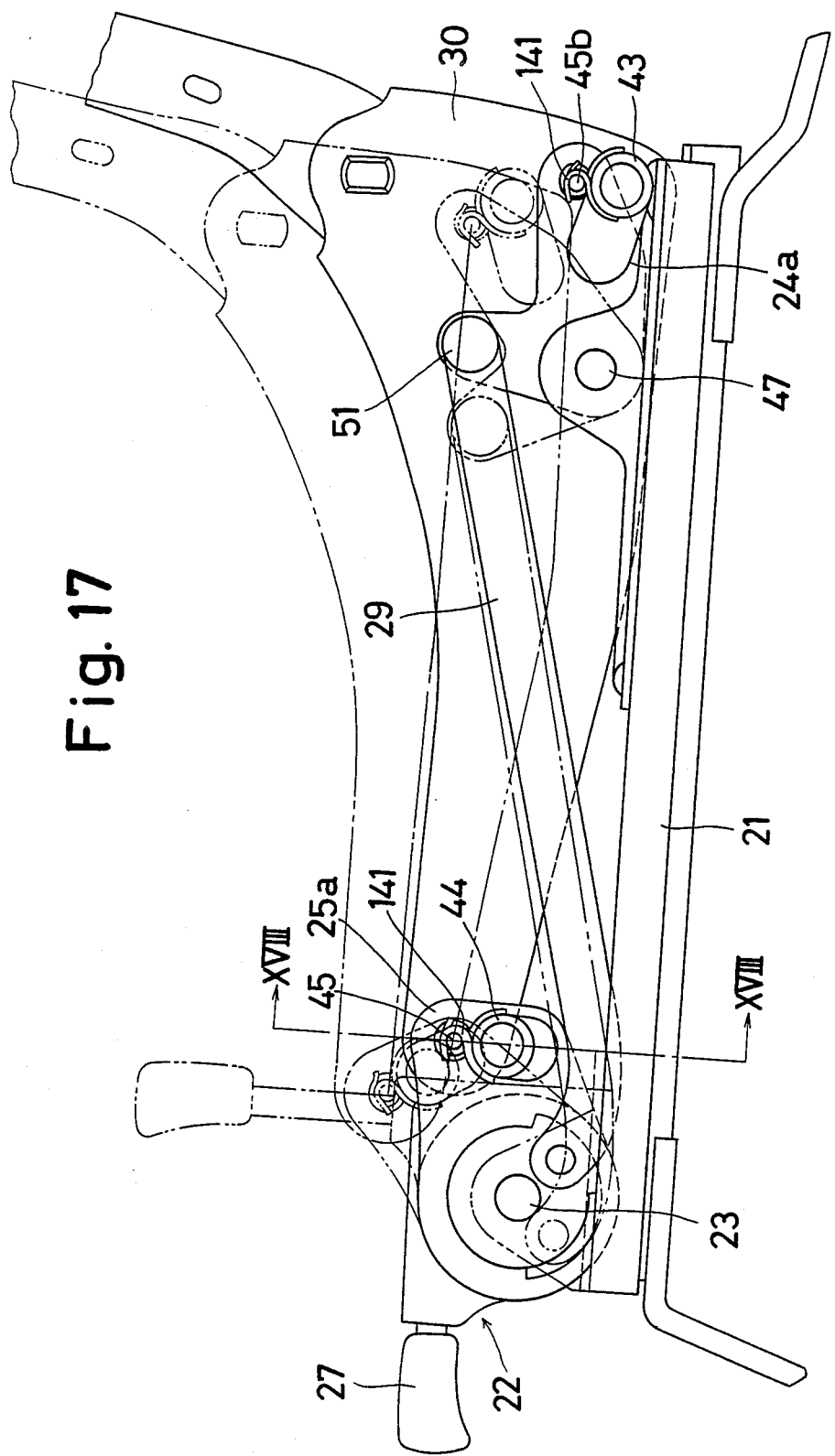
FIG. 17 is a side view of the seat lifter of FIG. 14.

A seat lifter 20d is shown in FIGS. 14 to 18 according to a fifth embodiment. This seat lifter 20d as shown in FIG. 15 is similar to the seat lifter 20, except that the pipes 44 and 43 are respectively disposed the same distance from the pins 23 and 47 as shown in FIG. 17; and the front and rear ends 45a and 45b of the seat spring 45 supporting the seat cushion 42 as shown in FIG. 16, are respectively mounted on the pipes 44 and 43 in a rotatable condition by clips 141 fixed on the pipes 44 and 43. The seat cushion 42 is directly disposed on the pipes 44,43 so that the bracket supporting the seat cushion 42 is not required; and the structure of the seat lifter becomes simple. Further, the pins 39,39b and 38,38b on which the front and rear ends of the bracket 30, which support the seat back 41, respectively pivot, are co-axially disposed with the pipes 44 and 43 as shown in FIG. 15.

We claim:

1. A seat lifting apparatus for a seat having a seat cushion and a seat back, said apparatus comprising:
   bracket means adapted to be mounted on a floor;
   first seat supporting means for supporting said seat cushion;
   second seat supporting means having front and rear portions for supporting said first seat supporting means at corresponding front and rear portions thereof, said first seat supporting means being pivotally mounted thereon;

seat back supporting means for supporting said seat back adjacent said rear portion of said second seat supporting means;

link means pivotally connected at first pivot locations, on said link means, to said bracket means on opposite sides of said second seat supporting means, said link means including front link members and rear link members, said front portion of said second set supporting means being fixedly attached at second pivot locations to said front link members, said rear portion being fixedly attached at said second pivot locations to said rear link members, said second pivot locations being spaced a selected distance from said first pivot locations on said front and rear link members in a first selected direction for lifting said second seat supporting means and pivoting said first seat supporting means while moving said first and second seat supporting means in a forward direction upon rotation of said link means a selected angular distance about said first pivot location;

seat back support pivot means pivotally connecting said link means, at third pivot locations, to said seat back supporting means adjacent said front and rear portions on opposite sides of said supporting means, said third pivot locations being spaced a selected distance from said first pivot locations on said link means in a second selected direction for moving said seat back supporting means together with said first seat supporting means upon said rotation of said link means about said first pivot locations;

connecting means pivotally attached at one end to one of said rear link members and operatively connected at the other end to a spring coupler means mounted on the bracket means adjacent to one of said front link members; said spring coupler means operatively connected to said connecting means and said link means for rotating said link means about said first pivot location said selected angular distance.

2. The seat lifting apparatus according to claim 1 wherein said spring coupler means comprises a manually operable clutch means operatively coupled to said front link member and said connecting means to pivot said link means said selected angular distance about said first pivot locations, said clutch means being operative to hold said link means against further rotation upon cessation of manual operation.

3. The seat lifting apparatus according to claim 2 wherein said clutch means comprises a base member surrounding said front link member, a drive member mounted on said link member within said base member, a driven member rotatably mounted on said front link member so as to be rotatable with the rotation of said front link member through said drive member, a coil spring around said link and frictionally connected to said base member for arresting rotation of said driven member and said spring, means operatively connected to said drive member for releasing said coil spring from said base member upon rotation of said front link member by said drive member in order to permit rotation of the driven member with said drive member.

4. The seat lifting apparatus according to claim 1 wherein said front portion of said second seat supporting means comprises a front connecting pipe disposed between each front link member for supporting the front of the seat cushion, and wherein said rear portion comprises a rear connecting pipe disposed between each rear link member for supporting the rear of the seat cushion.

5. The lifting apparatus as set forth in claim 4 wherein the selected distance of said second pivot location from said first pivot location on said front link member is greater than the selected distance of said second pivot location from said first pivot location on said rear link member.

6. A seat lifting apparatus for a seat having a seat cushion and a seat back, said apparatus comprising:
   bracket means adapted to be mounted on a floor;
   seat supporting means including seat frames on opposite sides of said seat cushion for supporting said seat;
   seat back supporting means pivotally mounted on said seat supporting means for supporting said seat back adjacent a rear portion of said seat frames;
   link means including a pair of front link members and a pair of rear link members, each of said front link members being pivotally connected to said bracket means adjacent a front portion of said seat frames on opposite sides of said seat cushion, each said rear link members being pivotally connected to said bracket means adjacent said rear portion of said seat frames, said link means being pivotally connected to said bracket means at a first pivot location on each respective link member;
   seat support pivot means for pivotally connecting front and rear portions of said seat frames to a second pivot location on each of said front and rear link members respectively, said second pivot location being spaced a selected distance and in a selected direction from said first pivot location on each respective link member;
   a side connecting member pivotally attached at one end to one of said rear link members and operatively connected at the other end to a spring coupler means mounted on the bracket means adjacent to one of said front link members; said
   spring coupler means operatively connected to said side connecting member for rotating said link members about said first pivot location.

* * * * *